US008686613B2

(12) United States Patent  (10) Patent No.: US 8,686,613 B2
Miyata  (45) Date of Patent: Apr. 1, 2014

(54) POWER GENERATING DEVICE AND ELECTRONIC DEVICE

(75) Inventor: Takashi Miyata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 360 days.

(21) Appl. No.: 13/284,167

(22) Filed: Oct. 28, 2011

(65) Prior Publication Data

US 2012/0126662 A1      May 24, 2012

(30) Foreign Application Priority Data

Nov. 19, 2010   (JP) ................................. 2010-258641

(51) Int. Cl.
*H02N 1/00*      (2006.01)
(52) U.S. Cl.
USPC ............................. 310/309; 310/300; 322/2 A
(58) Field of Classification Search
CPC ........... H02N 1/00; H02N 1/08; H02N 11/00; H02N 11/002
USPC ................... 310/300, 309; 322/2 A
See application file for complete search history.

(56) References Cited

U.S. PATENT DOCUMENTS

| 7,825,565 | B2* | 11/2010 | Suzuki | 310/317 |
| 7,965,016 | B2* | 6/2011 | Despesse et al. | 310/319 |
| 8,018,119 | B2* | 9/2011 | Matsubara et al. | 310/309 |
| 8,089,194 | B2* | 1/2012 | Naruse et al. | 310/309 |
| 8,384,267 | B2* | 2/2013 | Naruse et al. | 310/309 |
| 8,564,169 | B2* | 10/2013 | Sano | 310/309 |
| 2004/0007877 | A1 | 1/2004 | Boland et al. | |
| 2009/0243426 | A1* | 10/2009 | Sahin Nomaler et al. | 310/300 |
| 2010/0019616 | A1* | 1/2010 | Naruse et al. | 310/300 |
| 2011/0316384 | A1* | 12/2011 | Nakatsuka et al. | 310/300 |
| 2012/0306313 | A1* | 12/2012 | Nakatsuka et al. | 310/300 |

FOREIGN PATENT DOCUMENTS

| JP | A-2005-529574 | 9/2005 |
| JP | A-2008-113517 | 5/2008 |
| WO | WO 03/105167 A2 | 12/2003 |

\* cited by examiner

*Primary Examiner* — Burton Mullins
(74) *Attorney, Agent, or Firm* — Oliff PLC

(57) ABSTRACT

A power generating device includes a first substrate having a first electrode and a first positioning electrode being chargeable with a first polarity on a first surface, and a second substrate movable within a predetermined range from a static position in the planar direction of the first substrate and having a second electrode and a second positioning electrode being chargeable with a second polarity opposite to the first polarity on a second surface opposing the first surface. Overlapping the first positioning electrode and the second positioning electrode at least partially in plan view of the first substrate in the static position can cause the second substrate to return to the static position due to electrostatic attraction generated between the first positioning electrode and the second positioning electrode.

12 Claims, 10 Drawing Sheets

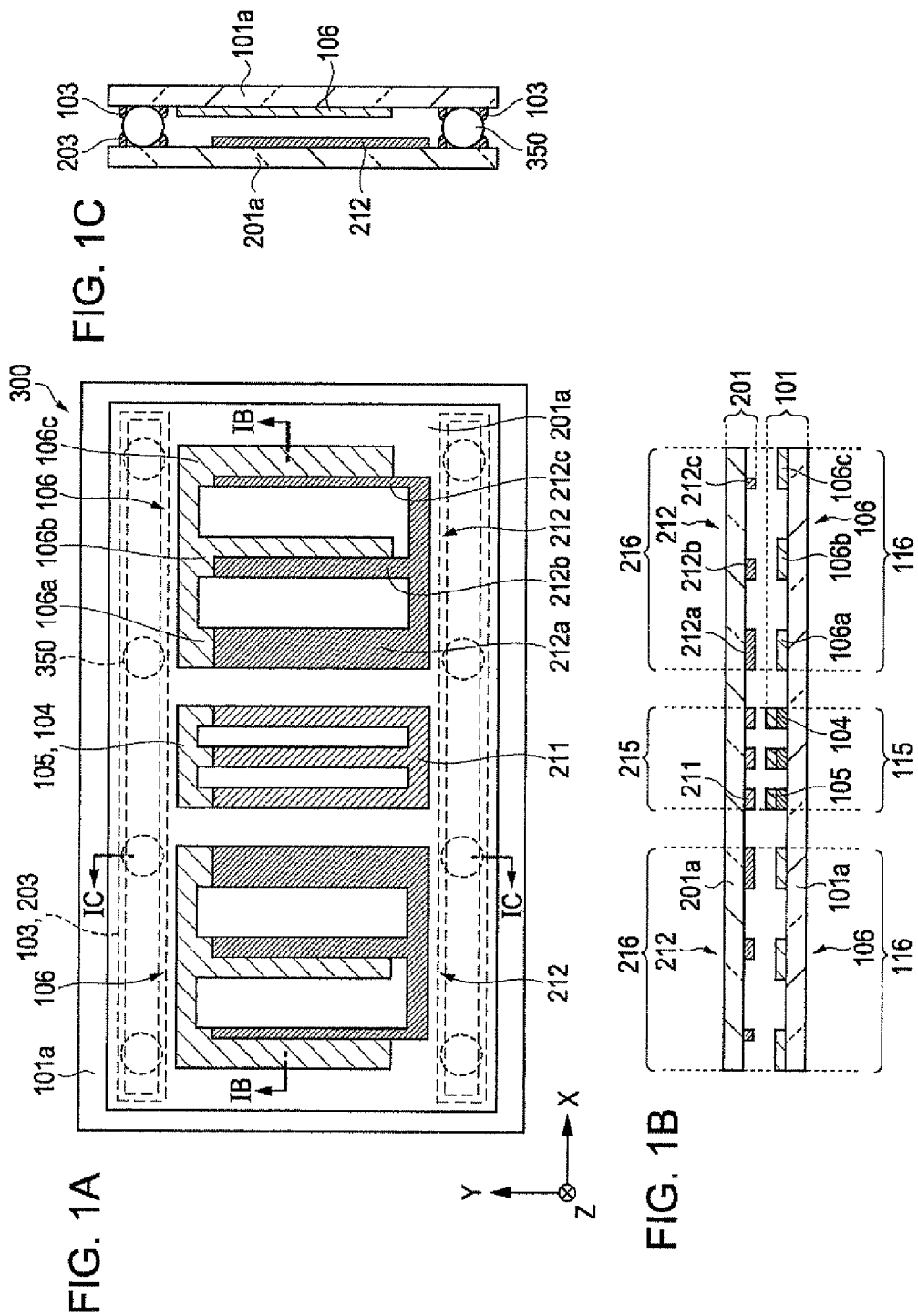

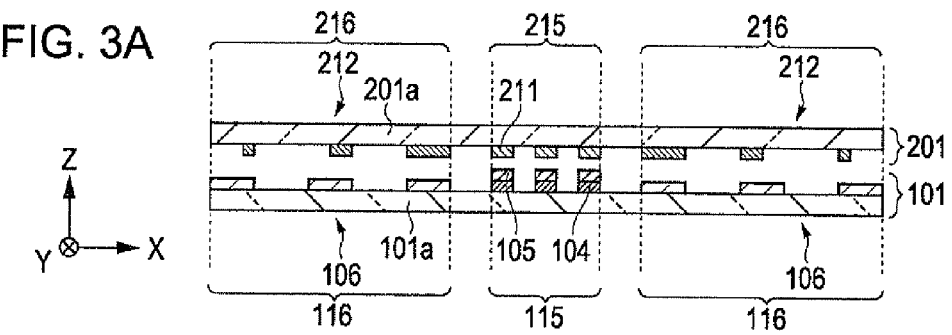
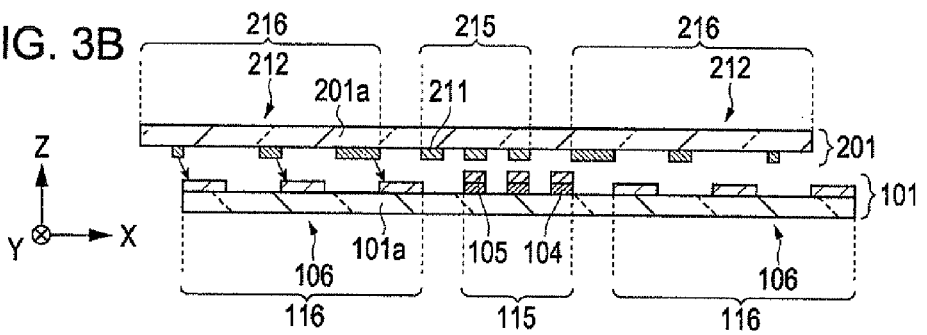
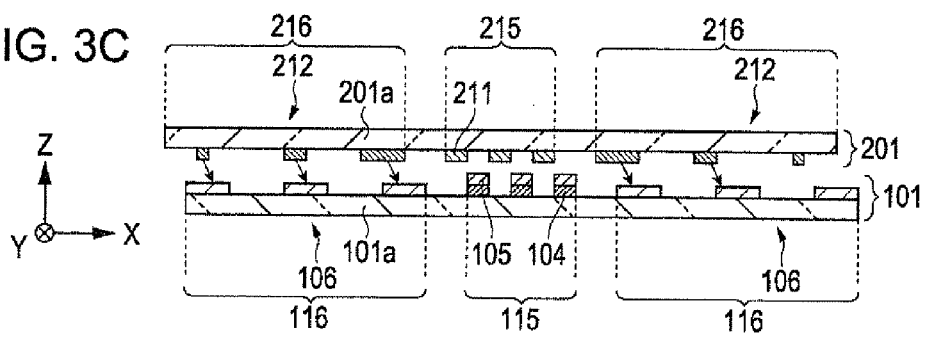
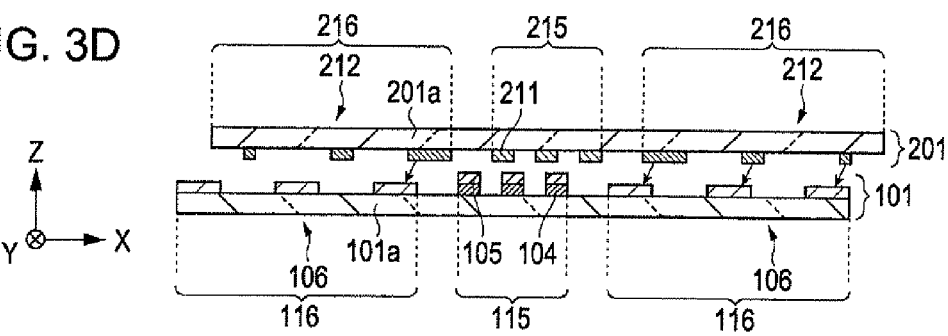

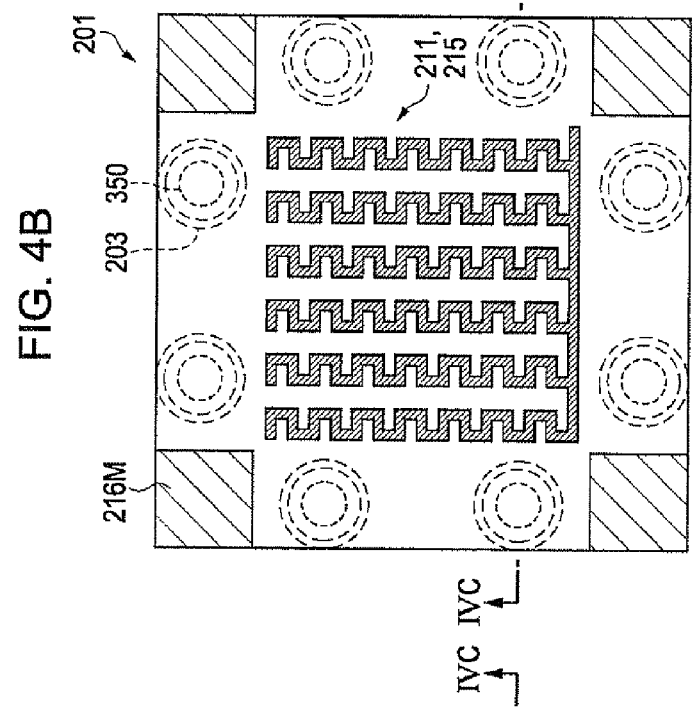
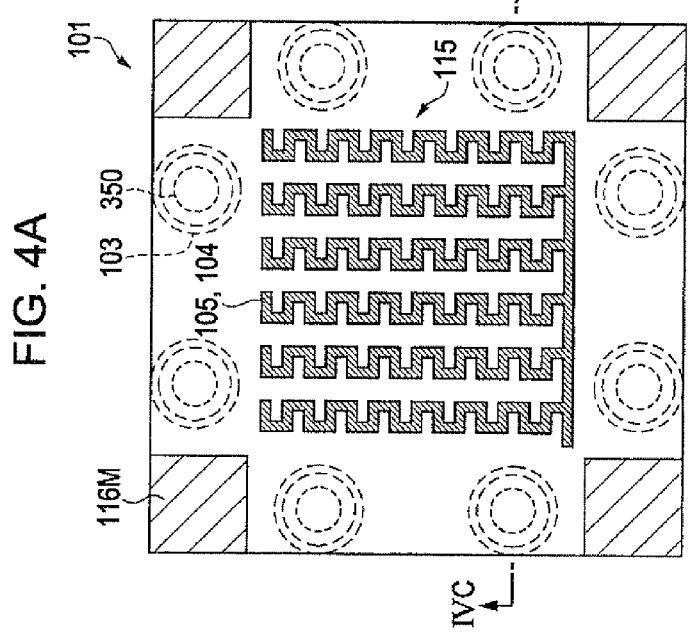
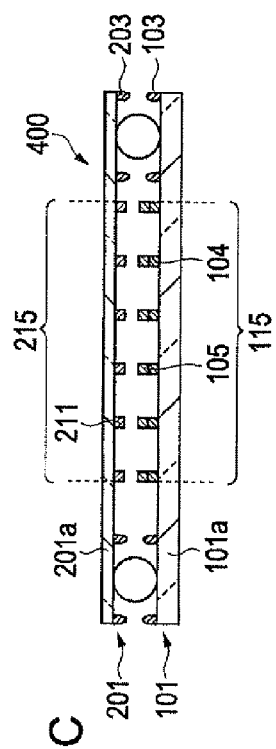

--PRIOR ART--

--PRIOR ART--

POWER GENERATING DEVICE AND ELECTRONIC DEVICE

BACKGROUND

1. Technical Field

The present invention relates to a power generating device and an electronic device.

2. Related Art

There is a power generating device which has a fixed substrate and a movable substrate arranged opposite to each other and effects power generation of an electrostatic induction type using vibration of the movable substrate.

In this case, for example, the fixed substrate includes, on a surface opposing the movable substrate, a fixed electrode having a conductor and a charging member (electret) overlapping each other and processed into a comb shape.

The movable substrate includes a movable electrode overlapping part of the fixed electrode in plan view of the fixed substrate on a surface opposing the fixed electrode of the fixed substrate.

When the movable substrate vibrates in the planar direction of the fixed substrate, vibration energy applied to the movable electrode changes the Coulomb attraction between the fixed electrode and the movable electrode. The change is collected as power to be converted into electric energy. That is, power generation is carried out.

When the movable substrate does not return to a static position, the generation efficiency drops. Therefore, it is preferable that the movable substrate return to a static position after the vibration. The term "a static position" indicates "a stop position," at which the movable substrate stops. Electrostatic energy generated between the fixed substrate and the movable substrate becomes a minimum when the movable substrate stops at the position. Various techniques have been proposed to return the movable substrate to the static position.

As shown in FIG. 11, for example, a second substrate (fixed substrate) 405 having a plurality of electret material regions 409 and a first substrate (movable substrate) 407 having a plurality of conductive surface regions 411 are arranged at a predetermined distance therebetween in JP-T-2005-529574.

In this case, the second substrate (fixed substrate) 405 including the electret material regions 409 is fixed, and the first substrate (movable substrate) 407 including the conductive surface regions 411 is coupled to fixed structures 417 via support springs 419. JP-T-2005-529574 discloses that the support springs 419 are connected to both side surfaces of the first substrate 407, and cause the first substrate 407 to make motion in the X direction (direction indicated by an arrow 421) and return to a static position.

JP-A-2008-113517 discloses that when magnetic bearings are used for movable portions 4 and magnets 3 are embedded in a fixed substrate 1, as shown in FIG. 10, the movable portions 4 can be returned to respective static positions by attraction generated by a magnetic field.

When the structure using the support springs 419 to return the movable substrate to the static position is employed as described in JP-T-2005-529574, however, the springs repeat compression and expansion movements during power generation. Therefore, the springs are likely to fatigue and deteriorate, which may reduce the reliability. When power generation is carried out at 50 Hz for one year, for example, the springs repeat compression and expansion movements about 1.6 billion times in total. Depending on the use conditions, the life of ordinary springs is 10 million to 100 million times or so in terms of the number of compression and expansion movements, which makes it difficult to maintain the reliability of the springs over a long period of time.

When springs are used, it is possible to convert energy of vibration in one axial direction to effect power generation, but it is difficult to convert energy of vibration in two axial directions (planar direction) to effect power generation because the springs supporting the movable substrate are twisted. This makes it difficult to improve the efficiency of converting vibration energy.

As described in JP-A-2008-113517, when the structure in which the movable substrate is returned to the static position by the magnets 3 is employed, the magnets 3 which are not actually used in power generation of the electrostatic induction type are included as components. Accordingly, it is necessary to design a manufacturing process that is not affected by the magnets 3. This increases the number of steps in the manufacturing process and may cause the production line to be damaged by an unexpected influence.

While strong attraction is generated near the magnets 3, the attraction becomes weaker when the magnets 3 and the bearing move away from each other. If the attraction becomes weak, the vibration of the movable substrate becomes small. Accordingly, the generation efficiency drops. When strong vibrations are applied to the movable substrate, it moves away from the magnets 3. The magnetic force becomes smaller as the distance to the magnets 3 becomes greater. When large vibration energy is applied, therefore, it takes time to return the movable substrate to the static position from a position far from the static position. In other words, the number of power generations per unit time decreases, so that the generation efficiency drops.

SUMMARY

An advantage of some aspects of the invention is to provide a power generating device and an electronic device in the following modes or as the following application examples.

APPLICATION EXAMPLE 1

To bring about the advantage, according to an aspect of the invention, there is provided a power generating device including a first substrate; a first electrode provided on a first surface of the first substrate; a second substrate having a second surface opposing the first surface with a distance between the first substrate and the second substrate and movable within a predetermined range from a static position in a planar direction of the first substrate; a second electrode provided on the second surface of the second substrate and at least partially overlapping the first electrode in plan view of the first substrate in the static position; a first positioning electrode provided on the first surface and being chargeable with a first polarity; and a second positioning electrode provided on the second surface and being chargeable with a second polarity opposite to the first polarity, the first positioning electrode and the second positioning electrode at least partially overlapping each other in plan view in the static position.

To bring about the advantage, according to an aspect of the invention, there is provided a power generating device including a first substrate having a first power generation electrode, which is chargeable and effects power generation, on a first surface thereof; a second substrate having a second surface opposing the first surface with a distance therebetween and movable within a predetermined range from a static position in a planar direction of the first substrate; a second power generation electrode effecting power generation, provided on the second surface and at least partially overlapping the first power generation electrode in a plan view of the first substrate first surface in the static position; a first positioning electrode provided on the first surface and being chargeable with a first polarity; and a second positioning electrode provided on the second surface and being chargeable with a second polarity opposite to the first polarity, the first positioning electrode and the second positioning electrode at least partially overlapping each other in plan view in the static position.

With the above configuration, the first positioning electrode provided on the first substrate and the second positioning electrode provided on the second substrate pull each other by electrostatic attraction. When vibration is applied for power generation and the first substrate and the second substrate move in the planar direction, force to attract both substrates each other acts to keep the power generation efficiency. This makes it possible to stably effect power generation between the first substrate and the second substrate.

The term "a static position" indicates "a stop position," at which the second substrate stops. Electrostatic energy generated between the first positioning electrode and the second positioning electrode becomes a minimum when the second substrate stops at the position.

APPLICATION EXAMPLE 2

In the power generating device according to the application example 1, each of the first positioning electrode and the second positioning electrode includes at least one of a plurality of electrodes and an electrode having a plurality of electrodes partially connected each other, the plurality of electrodes at least partially overlapping each other in plan view, and at least one of the first positioning electrode and the second positioning electrode has strap-like shapes of different widths or bending strap-like shapes of different widths.

According to the application example 2, at least one of the first positioning electrode and the second positioning electrode has strap-like shapes of different widths or bending strap-like shapes of different widths. Therefore, electrostatic force, which changes depending on the overlapping state of the first positioning electrode and the second positioning electrode, can be generated in a wider range in strength as compared with the case where positioning electrodes with the same width are used. It is possible to provide a power generating device which can generate power even if given vibration has large amplitude. The "strap-like shape" may be an electrode partially having a strap-like shape, or may have a structure that ends of strap-like electrodes are joined.

APPLICATION EXAMPLE 3

In the power generating device according to the application example 2, three or more regions having the strap-like shapes are formed in a widthwise direction, and pitches between the strap-like shapes at least partially different from each other.

According to the application example 3, the pitches between the strap-like shapes are made to differ from each other, the overlapping state of the strap-shaped first positioning electrode of the first substrate and second positioning electrode of the second substrate can be controlled in a wider range. This makes it possible to use vibration having wider amplitude, so that the power generating device can generate power even if given vibration has large amplitude.

APPLICATION EXAMPLE 4

In the power generating device according to the application example 2, the width of at least a part of regions having the strap-like shapes is wider than the widths of the first power generation electrode and the second power generation electrode.

According to the application example 4, since the width of at least a part of regions having the strap-like shapes is wider than the widths of the first power generation electrode and the second power generation electrode, the first substrate and the second substrate can be returned to the static position even when, for example, the first substrate and the second substrate are shifted much more than the widths of the first electrode and the second electrode.

APPLICATION EXAMPLE 5

In the power generating device according to the application example 1, the first positioning electrode and the second positioning electrode have shapes such that a total area of a region where the first positioning electrode and the second positioning electrode overlap each other in plan view decreases substantially monotonously to generate attraction between the first positioning electrode and the second positioning electrode to return the second substrate to the static position as the second substrate moves away from the static position in the planar direction.

According to the application example 5, it is possible to provide a power generating device whose first substrate and second substrate can surely return to the static position.

"To move away" indicates that the relative position of the first substrate to the second substrate moves from the static position in a steady state to another position away from the static position.

If the first positioning electrode, the second positioning electrode, and the space therebetween are regarded to be portions of a capacitor, the energy of the capacitor is represented by $q^2/2C$, where q is a charge and C is the capacitance. When the positions of the first positioning electrode and the second positioning electrode are slightly shifted, the overlapping area (C) is also decreased. Therefore, the total amount of energy of the power generating device increases.

Normally, since the first substrate and the second substrate are urged to move in a direction to reduce the total amount of their energy (or to reach stable state), the first substrate and the second substrate return to the static position or the state where the total amount of energy of the power generating device reaches the lowest level. In addition, since attraction is generated by the fringe effect, which is generated in a direction of obliquely pulling back the first substrate and the second substrate with respect to the thickness direction, and involved in the pull-back action, the attraction to pull back the substrates becomes stronger.

The expression "substantially monotonously" includes a case where the substrates can quickly return from a quasi-static position to the static position during power generation. In order to avoid such a situation that the substrates stop at the quasi-static position, it is preferable to set the shape of the region so that the total area of the region where the first positioning electrode and the second positioning electrode overlap each other in plan view decreases monotonously as the second substrate moves away from the static position.

APPLICATION EXAMPLE 6

In the power generating device according to the application example 1, at least one of the first power generation electrode and the second power generation electrode includes an electret member being chargeable.

According to the application example 6, the first power generation electrode or the second power generation electrode includes an electret member being chargeable. When the electret member is used, the charge state of the first power generation electrode or the second power generation electrode is stable, making it possible to keep stable power generation efficiency.

APPLICATION EXAMPLE 7

An electronic device according to this application example includes the power generating device according to any one of the application examples.

Since the power generating device does not have a region which deforms, it has a high reliability. Therefore, an electronic device equipped with the power generating device has a high reliability.

BRIEF DESCRIPTION OF THE DRAWINGS

The invention will be described with reference to the accompanying drawings, wherein like numbers reference like elements.

FIG. 1A is a plan view of a power generating device, FIG. 1B is a cross-sectional view along line IB-IB in FIG. 1A, and FIG. 1C is a cross-sectional view along line IC-IC in FIG. 1A.

FIGS. 3A to 3D are exemplary diagrams showing a mechanism of pulling back a movable substrate to a static position when the movable substrate is shifted.

FIG. 4A is a plan view of a fixed substrate of a power generating device, FIG. 4B is a plan view of a movable substrate, and FIG. 4C is a cross-sectional view showing the fixed substrate and the movable substrate overlapping each other.

DESCRIPTION OF EXEMPLARY EMBODIMENTS

Figure 2A:
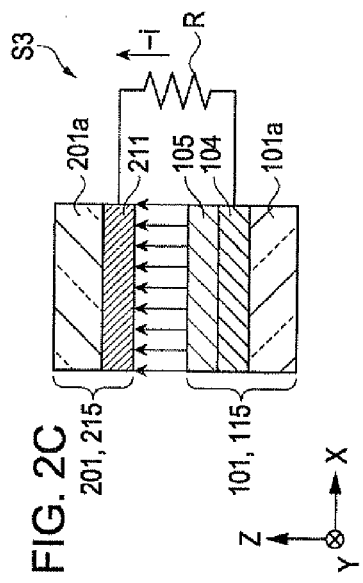
FIGS. 2A to 2D are cross-sectional views showing states in a region where power generation is carried out.

Exemplary embodiments of the present invention will be described below with reference to the accompanying drawings.

First Embodiment

The first embodiment will be described referring to the accompanying drawings. In the description of the first embodiment, the power generating device which generates power based on vibration in one axial direction will be described.

FIG. 1A is a plan view of a power generating device, FIG. 1B is a cross-sectional view along line IB-IB in FIG. 1A, and FIG. 1C is a cross-sectional view along line IC-IC in FIG. 1A.

The power generating device 300 is movable in a direction (X direction) where comb tooth portions to be described later cross each other, and converts energy of vibration in the X direction to electric energy.

The power generating device 300 has a fixed substrate 101 as a first substrate and a movable substrate 201 as a second substrate facing each other with a distance therebetween.

"Up" p is defined as a direction toward the movable substrate 201 from the fixed substrate 101.

The fixed substrate 101 has a first substrate body 101a, and has a guide 103, a collecting electrode 104, a first power generation electrode 105, and a first positioning electrode 106 on a first surface of the fixed substrate 101 (first surface of the first substrate body 101a). The first power generation electrode 105 serves to generate power in cooperation with a second power generation electrode 211 to be described later.

The first positioning electrode 106 includes a plurality of first positioning electrodes 106a, 106b, and 106c. The first positioning electrodes 106a, 106b, and 106c are connected together at one ends.

The movable substrate 201 has a second surface opposing the first surface of the fixed substrate 101 with a distance therebetween, and includes a second substrate body 201a, a guide 203 and a plurality of second positioning electrodes 212 to be described later on the second surface.

The second power generation electrode 211 serves to generate power in cooperation with the first power generation electrode 105.

The first positioning electrode 106 and the second positioning electrode 212 both have strap-like shapes, and at least partially overlap each other in the widthwise direction in plan view of the fixed substrate 101 so that the movable substrate 201 is caused to approach a static position.

The movable substrate 201 includes, for example, second positioning electrodes 212a, 212b, and 212c which are connected together at one ends.

The widths of the second positioning electrode 212a, the second positioning electrode 212b, and the second positioning electrode 212c are changed from one another. Specifically, the width of the second positioning electrode 212a is the widest, and the widths of the second positioning electrode 212b and the second positioning electrode 212c are set narrower in the named order.

The pitch between the second positioning electrode 212a and the second positioning electrode 212b is set different from the pitch between the second positioning electrode 212b and the second positioning electrode 212c. Specifically, the pitch between the second positioning electrode 212b and the second positioning electrode 212c is set wider.

Although the widths of the electrodes of the movable substrate 201 are changed in the description of the first embodiment, the same can be applied to a case where the widths of the electrodes of the fixed substrate 101 are changed.

Fluorine polymer materials, such as a fluorine resin and fluoro carbon resin, inorganic materials, such as polyethylene, polystyrene, polypropylen and polyethylene terephthalate, and organic materials, such as silicon oxide and silicon nitride, are available as constituting materials for the first power generation electrode 105, the first positioning electrode 106, and the second positioning electrode 212.

Available charging methods include a method of injecting positive or negative ions generated by corona discharge into the aforementioned non-conductive materials, and a method of applying a high DC voltage to needle-like electrodes to generate ions in the air, and injecting the ions into the aforementioned non-conductive materials.

Further, methods of causing intermittent charging, such as a method of intermittently causing corona discharge and a method of applying a high DC voltage in a pulse form, may be used as well.

With the above charging method used, the first positioning electrode 106 is charged with a first polarity, and the second positioning electrode 212 is charged with a second polarity opposite to the first polarity. The first power generation electrode 105 may be charged with charges of either polarity.

The fixed substrate 101 and the movable substrate 201 are overlapped each other via bearings 350 so as to be relatively movable in the X direction. Power generation is carried out by a first power generating part 115 including the collecting electrode 104 and the first power generation electrode 105, and a second power generating part 215 including the second power generation electrode 211 on the movable substrate 201. Each of the collecting electrode 104, the first power generation electrode 105, and the second power generation electrode 211 has a comb-teeth electrode structure, and the movable substrate 201 vibrates in a direction (X direction) where comb teeth cross each other. The following will describe a case where the direction perpendicular to the comb teeth is the X direction.

A first restoring part 116 including the first positioning electrode 106 and a second restoring part 216 including the second positioning electrode 212 respectively generate forces to pull the fixed substrate 101 and the movable substrate 201 back to the static position.

The "staying at a static position" indicates a state where electrostatic energy between the first positioning electrode 106 and the second power generation electrode 211 takes a minimum value, and the fixed substrate 101 and the movable substrate 201 remain relatively stationary.

The first positioning electrode 106 and the second positioning electrodes 212 partially overlap each other two-dimensionally in the static position in plan view of the fixed substrate 101.

According to the embodiment, the second positioning electrode 212a has a wider width than the first power generation electrode 105 and the second power generation electrode 211. When the collecting electrode 104 and the second power generation electrode 211 are shifted by one pitch or more, therefore, the fixed substrate 101 and the movable substrate 201 can be finally pulled back to the static position. The details will be given later.

The second positioning electrodes 212 have different widths and are aligned in the widthwise direction with different pitches therebetween. This makes it possible to control the overlapping state of the first positioning electrode 106 and the second positioning electrodes 212 in a wide range. The details will be given later. Although the widths of, and the pitches between, the strap-shaped electrodes of the second positioning electrodes 212 are changed in the foregoing description of the embodiment, the same can be applied to the first positioning electrodes 106a, 106b, and 106c instead of the second positioning electrodes 212.

Glass or plastic, for example, is used as a constituting material for the first substrate body 101a. The surface of the first substrate body 101a on the movable substrate 201 has a flat shape, so that the first substrate body 101a does not collide with the movable substrate 201 when the movable substrate 201 moves.

The guide 103 defines the direction in which the bearings 350 rotate. According to the embodiment, the power generating device 300 has some degree of freedom in one direction (X direction). Therefore, the power generating device 300 has the guide 103 to prevent movement in directions other than this direction. The guide 103 may be formed by a method of coating a resin on the first substrate body 101a or by using a photolithography process after forming a photosensitive resin layer. Instead of a structure of stacking the guide 103, a groove (not shown) may be formed in the first substrate body 101a or the second substrate body 201a so that the bearings 350 rotate in one direction.

Like the first substrate body 101a, the second substrate body 201a is formed of glass or plastic, for example, as a constituting material. The surface of the first substrate body 101a on the movable substrate 201 is flat, so that the second substrate body 201a does not collide with the movable substrate 201 when the movable substrate 201 moves. The guide 203 together with the guide 103 defines the direction in which the bearings 350 rotate.

Power Generating Mechanism

The following will describe a mechanism of generating power by applying vibration to the first power generating part 115 including the collecting electrode 104 and the first power generation electrode 105, and the second power generating part 215 including the second power generation electrode 211. FIGS. 2A to 2D are cross-sectional views showing states in a region where power generation is carried out.

Figure 2C:
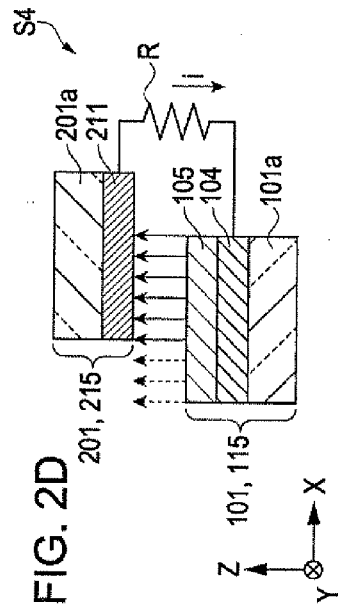

In step S1, when the second power generating part 215 is not vibrating, as shown in FIG. 2A, the electric lines of force (indicated by arrows) do not change with time (indicated by t as the horizontal axis in FIG. 2E), so that power which is generated by a change in the state of the electric lines of force. Accordingly, no power generation is carried out as indicated by S1 in FIG. 2E.

Figure 2B:
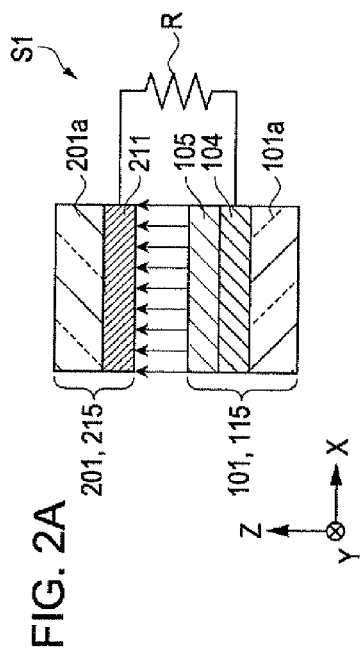

In next step S2, when the movable substrate 201 is moved in a −X direction, as shown in FIG. 2B, the movable substrate 201 is shifted from the fixed substrate 101, reducing the capacitance of a capacitor including the second power generation electrode 211 and the first power generation electrode 105. The reduction in capacitance moves charges via a resistor R. That is, a current i flows as indicated by S2 in FIG. 2E. When the movable substrate 201 is moved in the −X direction and stopped, movement of the charges ends, i.e., the current i stops.

In next step S3, when the movable substrate 201 is returned to the static position, as shown in FIG. 2C, the capacitance of the capacitor including the second power generation electrode 211 increases. The increase in capacitance moves charges via the resistor R, so that a current in the opposite direction to the one in FIG. 2B, i.e., a current (−i) flows as indicated by 33 in FIG. 2E. When the movable substrate 201 is returned to the static position and stopped, movement of the charges ends, i.e., the current i stops.

Figure 2D:
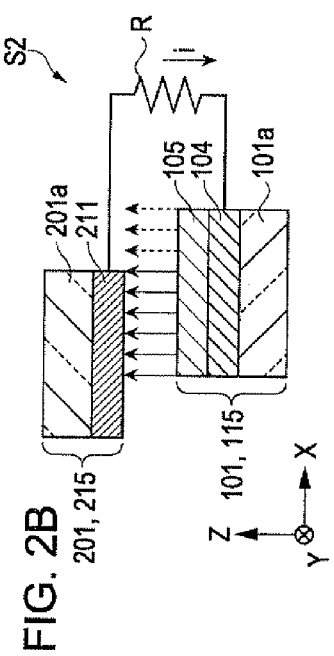
Figure 2E:
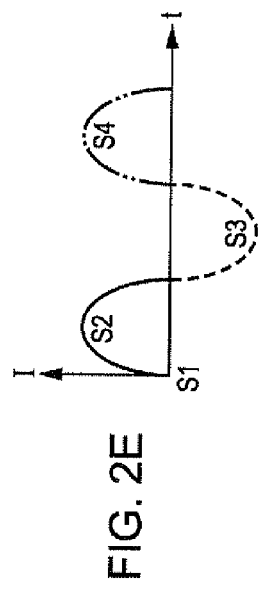
FIG. 2E is a diagram showing the waveform of a current.

In next step S4, when the movable substrate 201 is moved in a +X direction, as shown in FIG. 2D, the movable substrate 201 is shifted from the fixed substrate 101, reducing the capacitance of the capacitor including the second power generation electrode 211 and the first power generation electrode 105. The reduction in capacitance moves charges via the resistor R. That is, the current i flows as indicated by S4 in FIG. 2E. When the movable substrate 201 is moved in the +X direction and stopped, movement of the charges ends, i.e., the current i stops.

Repeating the above operation, power generation is carried out based on the vibration energy. When comb-teeth electrodes are included, vibration may be carried out over a plurality of electrodes. In this case, power generation is also effected.

Although vibration is applied to the first power generating part 115 including the collecting electrode 104 and the first power generation electrode 105 and the second power generating part 215 including the second power generation electrode 211 to generate power in the embodiment, the first power generating part 115 may be mounted on the movable substrate 201, and the second power generating part 215 on the fixed substrate 101.

At least one of the first power generation electrode 105 and the second power generation electrode 211 may be set in a state (electret) being chargeable. Even when a chargeable electret member on the first power generation electrode 105 or the second power generation electrode 211 is used, the charge state is made stable by at least one of the first power generation electrode 105 and the second power generation electrode 211, a stable power generation efficiency can be maintained.

Pull-back Mechanism

A pull-back mechanism for holding the power generating device 300 in a power generatable state will be described below. FIGS. 3A to 3D are cross-sectional views corresponding to FIG. 1B, and are exemplary diagrams showing a mechanism of pulling back the movable substrate to the static position when the movable substrate is shifted.

As shown in FIG. 1B, the second positioning electrodes 212 of the power generating device 300 have strap-like shapes with different widths and disposed at different pitches.

The following will describe the pull-back mechanism of pulling back the movable substrate 201 in the power generating device 300 referring to FIGS. 3A to 3D.

FIG. 3A shows a case where the movable substrate 201 is in the static position. In this case, the movable substrate 201 is in a balanced state so that no force to pull back the movable substrate 201 is generated.

Next, when forces are applied to the movable substrate 201 in the −X direction and −Y direction, as shown in FIG. 3B, the force in the −Y direction is suppressed by the guides 103 and 203 (see FIG. 1C), so that the movable substrate 201 does not move in the −Y direction.

Therefore, the force to move the movable substrate 201 in the −X direction remains, so that the movable substrate 201 moves in the −X direction.

Next, as shown in FIG. 3C, the second positioning electrode 212 of the movable substrate 201 and the first positioning electrode 106 of the fixed substrate 101 attract each other, generating attraction in the +X direction. As a result, the speed of the movable substrate 201 moving in the −X direction becomes lower with the passage of time, so that the movable substrate 201 moves in the +X direction this time.

Next, as shown in FIG. 3D, the movable substrate 201 reaches the static position, and then passes through the static position due to the inertial force of the movable substrate 201 to move in the +X direction.

During the above operation, power is generated by the first power generating part 115 and the second power generating part 215. In other words, the kinetic energy of the movable substrate 201 is converted to power. Accordingly, the amplitude of the vibration of the movable substrate 201 becomes gradually smaller, and finally stops at the static position. When force is applied again before the movable substrate 201 stops, a similar operation is repeated to carry out power generation.

In this case, the width of the second positioning electrode 212a having the greatest width in the second positioning electrodes 212 is wider than the widths of the first power generation electrode 105 and the second power generation electrode 211, so that even when the movable substrate 201 is shifted considerably from the static position (e.g., by more than the width of the second power generation electrode 211), restoring force can be acquired at the end portion of the first positioning electrode 106, making it possible to pull back the movable substrate 201 to the static position.

The second positioning electrodes 212 have different widths and have strap-like shapes with different pitches therebetween as mentioned above. It is possible to control the overlapping state of the first positioning electrode 106 and the second positioning electrodes 212. That is, the pull-back force with a stable intensity can be generated in a wide amplitude range.

Therefore, generating weak pull-back force in the vicinity of the static position, for example, can improve the power generation efficiency by generating power with suppressed attenuation of the amplitude when the amplitude is small.

When a strong and large amplitude is applied, for example, the pull-back operation can be performed with strong pull-back force generated. The generation of strong pull-back force can cause the movable substrate 201 to reciprocate in the vicinity of the first power generating part 115 and the second power generating part 215 where the power generation efficiency is high. That is, a high power generation efficiency (converting vibration energy of the movable substrate 201 to electric energy with a small loss) can be obtained.

The power generating device 300 has the following advantages.

As shown in FIGS. 1A and 1B, the power generating device 300 uses the bearings 350 which are more fatigue resistant than springs, so that the reliability can be improved. Specifically, when the power generating device 300 is vibrated at 50 Hz as the vibration circle, for example, the springs repeat compression and expansion about 1.6 billion times in a year. The durable number of compressions and expansions of ordinary metallic springs is 10 million to 100 million times or so, which makes it difficult to maintain the reliability of the springs. On the other hand, the bearings 350 do not have compressing and expanding portions and do not thus have a degradation factor, so that the reliability can be improved.

Figure 10:
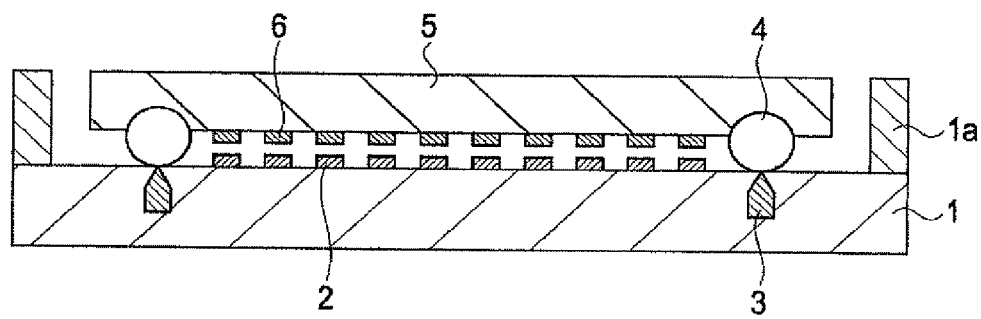
FIG. 10 is a cross-sectional view for explaining the background of the invention.
Figure 11:
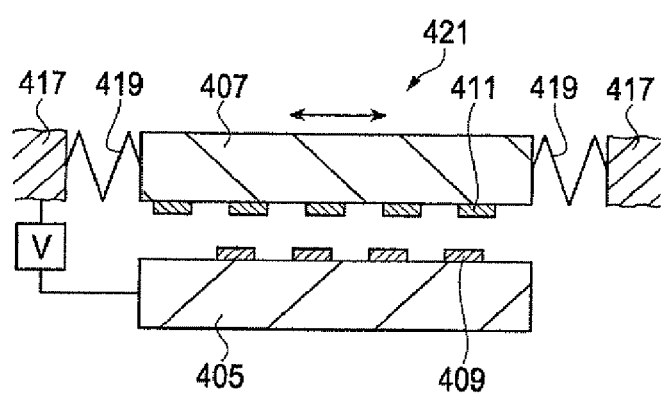
FIG. 11 is a cross-sectional view for explaining the background of the invention.

When the movable substrate 201 is shifted considerably from the static position, it is preferable that large storing force should act according to the amount of the shift. When the movable substrate 201 is shifted considerably from the static position, the structure of related art which uses the magnets 3 (see FIG. 10) to guide the movable substrate to the static position takes time to return the movable substrate to the static position since the magnetic force is inversely proportional to the square of the distance. As a result, the efficiency of converting vibration energy to electric energy drops. When weak vibration is applied to the movable substrate 201, the retaining force of the magnets 3 becomes stronger, preventing smooth movement of the movable substrate 201. This also lowers the efficiency of converting vibration energy to electric energy.

With the use of the structure of the second positioning electrodes 212 (see FIGS. 1A and 1B) having different widths as in the embodiment, when the deviation of the movable substrate 201 is large, strong electrostatic force can be generated to promptly guide the movable substrate 201 to the static position. Therefore, the time to return the movable substrate 201 to the static position is shortened, providing high power generation efficiency. When weak vibration is applied to the movable substrate 201, the amplitude of the movable substrate 201 can be secured with weak electrostatic force, making it possible to keep the energy conversion efficiency high.

The second positioning electrode 212a (see FIGS. 1A and 1B) has a wider width than the first power generation electrode 105 and the second power generation electrode 211. When the first power generation electrode 105 and the second power generation electrode 211 are shifted by one period or more, the movable substrate 201 can be returned to the static position eventually.

When comb-teeth electrodes are included, vibration may be carried out over the first power generation electrode 105 and the second power generation electrode 211. In this case, even when the movable substrate 201 vibrates at large amplitude, vibration energy can be converted to electric energy, i.e., power generation can be carried out.

In case of using the structure of pulling the movable substrate 201 back to the static position with the magnets 3 (see FIGS. 1A and 13), the magnets 3 which are not actually used in power generation of the electrostatic induction are included as components. Accordingly, it is necessary to design a manufacturing process that is not affected by the magnets 3. This increases the number of steps in the manufacturing process. In addition, the production line may be damaged by an unexpected influence. The constructing the power generating device 300 (see FIGS. 1A and 1B) using materials which are normally used in power generation of the electrostatic induction type, thus suppressing an increase in the number of steps and suppressing occurrence of unexpected damages on the production line.

In case of using the magnets 3 (see FIG. 10), when magnetic powder enters the power generating device 300, the magnetic powder is adhered to the magnets 3 (see FIG. 10), restricting the movement of the movable portion 4. This reduces the power generation efficiency or disables power generation. To cope with this problem, the power generating device needs to be accommodated in a casing with no excessive clearance. However, the use of the structure of the embodiment can provide a highly reliable power generating device which suppresses reduction in power generation efficiency even when magnetic powder slightly enters the power generating device.

Even if small amount of dust is adhered to the second positioning electrode 212a (see FIGS. 1A and 1B), the fixed substrate 101 and the movable substrate 201 can vibrate. Therefore, a casing with low airtightness can be used.

Second Embodiment

The second embodiment will be described referring to the accompanying drawings. The description of the second embodiment is given of a power generating device which generates power based on the vibration in two axial directions (XY: plane). To avoid the redundant detailed description, like or same reference numerals are given to those components of the second embodiment which are the same as the corresponding components of the first embodiment.

FIG. 4A is a plan view of a fixed substrate of the power generating device, FIG. 4B is a plan view of a movable substrate, and FIG. 4C is a cross-sectional view showing the fixed substrate and the movable substrate overlapping each other. This power generating device 400 is movable in a planar direction and converts energy of vibration to electric energy in the planar direction.

The power generating device 400 includes a fixed substrate 101 and a movable substrate 201.

The fixed substrate 101 includes a first substrate body 101a, a guide 103, a collecting electrode 104, a first power generation electrode 105, and first restoring parts 116M.

The collecting electrode 104 and the first power generation electrode 105 overlap each other in a thickness direction. A first power generating part 115 shaped in such a way that the collecting electrode 104 and the first power generation electrode 105 are continual in approximately U-shapes changing the directions is formed on a surface of the first substrate body 101a which lies on the movable substrate 201. The first restoring part 116M will be described later.

The movable substrate 201 includes a second substrate body 201a, a guide 203, a second power generation electrode 211 and second restoring parts 216M.

The second power generation electrode 211 has a pattern of mirror-inversion of the first power generation electrode 105 on a surface of the second substrate body 201a which lies on the fixed substrate 101 so that the second power generation electrode 211 overlaps the first power generation electrode 105 when the movable substrate 201 is placed on the fixed substrate 101. The second restoring part 216M will be described later.

Glass or plastic, for example, is used for the first substrate body 101a and the second substrate body 201a as a constituting material as per the first embodiment. The first power generation electrode 105, the first positioning electrode 106 and the second positioning electrode 212 are formed of materials similar to those of the first embodiment and by a charging method similar to the one used in the first embodiment.

The fixed substrate 101 and the movable substrate 201 are placed on each other via bearings 350 so that they can move relatively in the planar direction. The bearings 350 are illustrated on the movable substrate 201 side too as on the fixed substrate 101 side in such a way as to indicate the positions where the bearings 350 should be present.

The guides 103, 203 have functions of restricting the movable region of the movable substrate 201 with respect to the fixed substrate 101. The relatively movable range of the movable substrate 201 is limited to a range where the bearings 350 can move in the internal space between the guide 103 and guide 203.

The first restoring parts 116M are located, for example, at four corners of the fixed substrate 101. The second restoring parts 216M are located at four corners of the movable substrate 201. The first restoring part 116M and the second restoring part 216M have approximately mirror-inverted patterns so that restoring force is demonstrated when the fixed substrate 101 and the movable substrate 201 overlap each other. The second restoring part 216M on the movable substrate 201 has a strap-like shape having straps of different widths bent. The first restoring part 116M of the fixed substrate 101 has a strap-like shape having straps of the same width bent.

Figure 5B:
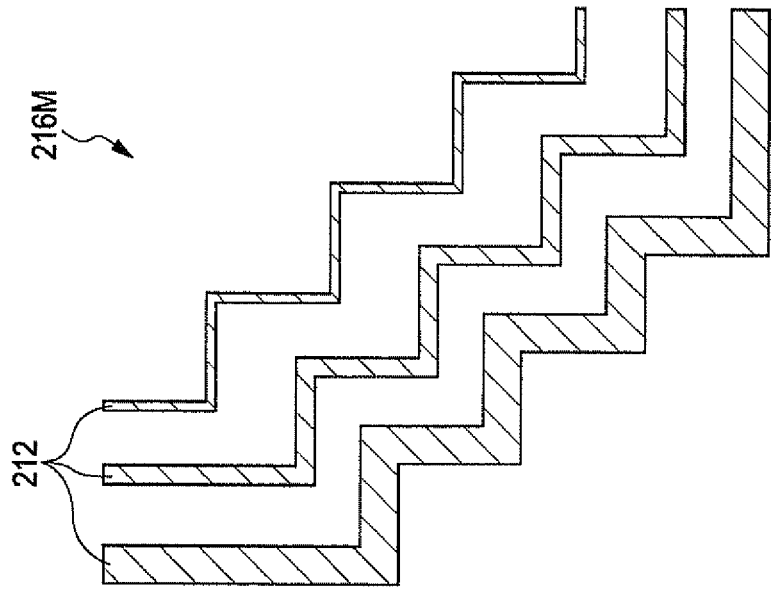
FIGS. 5A and 5B are plan views showing one example of a first restoring part and a second restoring part.
Figure 5A:
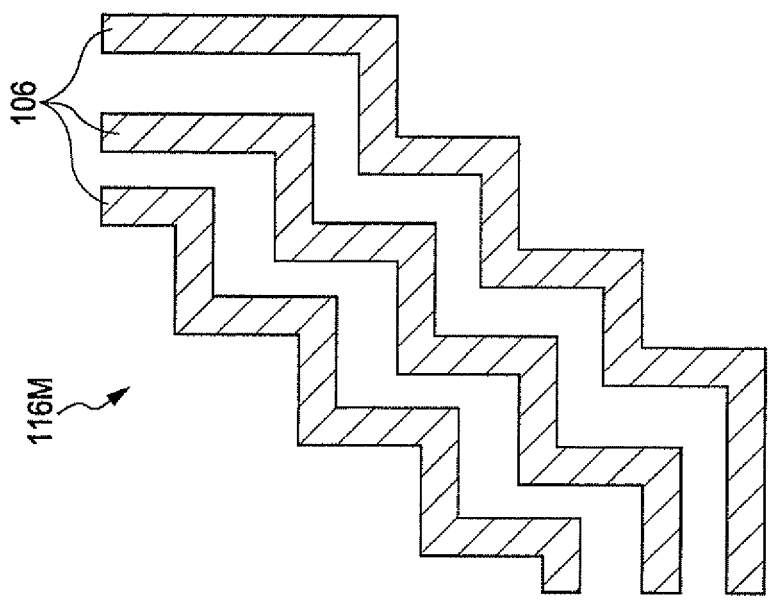

FIGS. 5A and 5B are plan views showing one example of the first restoring part 116M and the second restoring part 216M. The first restoring part 116M includes the first positioning electrode 106 and the second restoring part 216M includes the second positioning electrode 212 so that restoring force is demonstrated when the movable substrate 201 and the fixed substrate 101 overlap each other. The thickest pattern width of the second positioning electrode 212 is greater than the pattern width of the first power generation electrode 105.

Since at least part of the second positioning electrode 212 has a wider pattern width than the first power generation electrode 105 and the second power generation electrode 211, restoring force can be acquired at the end portion of the first positioning electrode 106 to pull the movable substrate 201 back to the static position even when the movable substrate 201 is shifted considerably from the static position (e.g., by more than the width of the second power generation electrode 211).

The second positioning electrodes 212 are disposed at different pitches, and have strap-like shapes with bent straps of different widths. It is therefore possible to control the overlapping state of the first positioning electrode 106 and the second positioning electrodes 212 in a wide range. That is, the pull-back force with stable strength can be generated in a wide amplitude range. Further, the first positioning electrode 106 and the second positioning electrodes 212 partially overlap each other in plan view of the fixed substrate 101 so as to generate pull-back force.

Therefore, generating weak pull-back force in the vicinity of the static position, for example, can improve the power generation efficiency by generating power with suppressed attenuation of the amplitude when the amplitude is small.

Figure 6B:
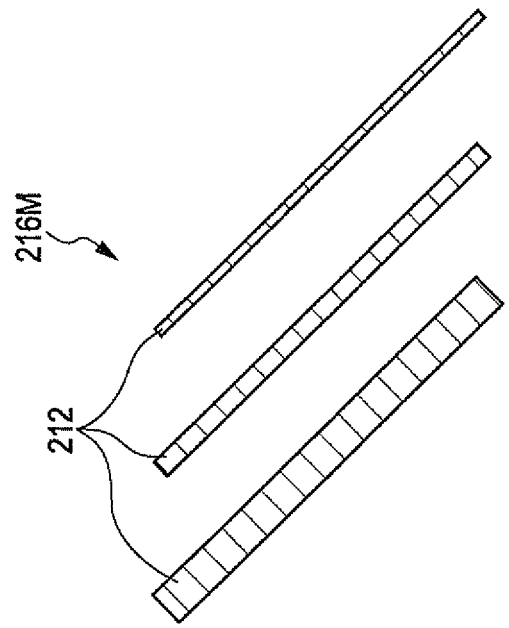
FIGS. 6A and 6B are plan views when the shapes of the restoring parts are changed.
Figure 6A:
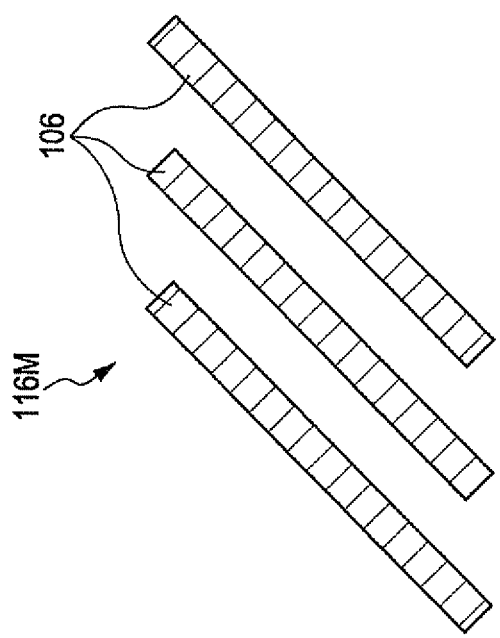

The first restoring part 116M and the second restoring part 216M may have different shapes. FIGS. 6A and 6B are plan views when the shapes of the restoring parts are changed. Each of the first restoring part 116M and the second restoring part 216M has an oblique strap-like shape, and has a mirror-inversion pattern of the other. The use of such shapes can also generate pull-back force with stable strength in a wide amplitude range. In this case, the width of the second positioning electrode 212 of the second restoring part 216M is made narrower outward.

Figure 7A:
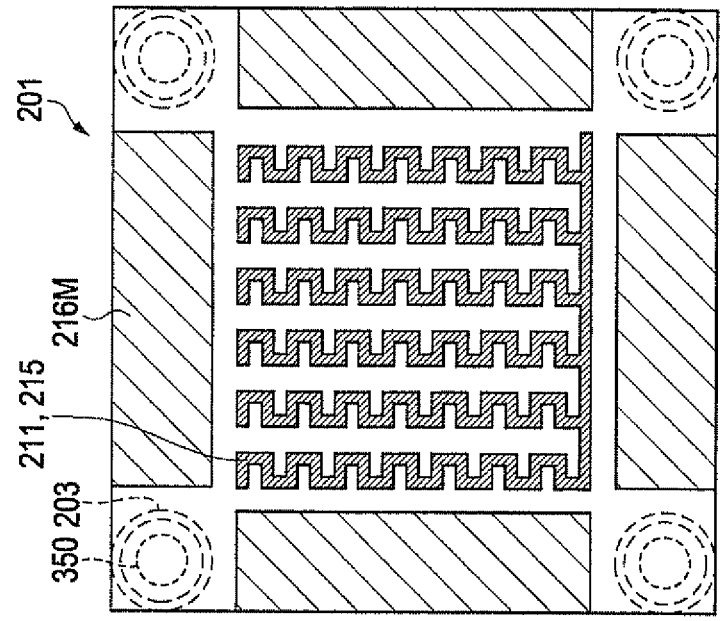
FIGS. 7A and 7B are plan views when the restoring parts are arranged in a side direction.
Figure 7B:
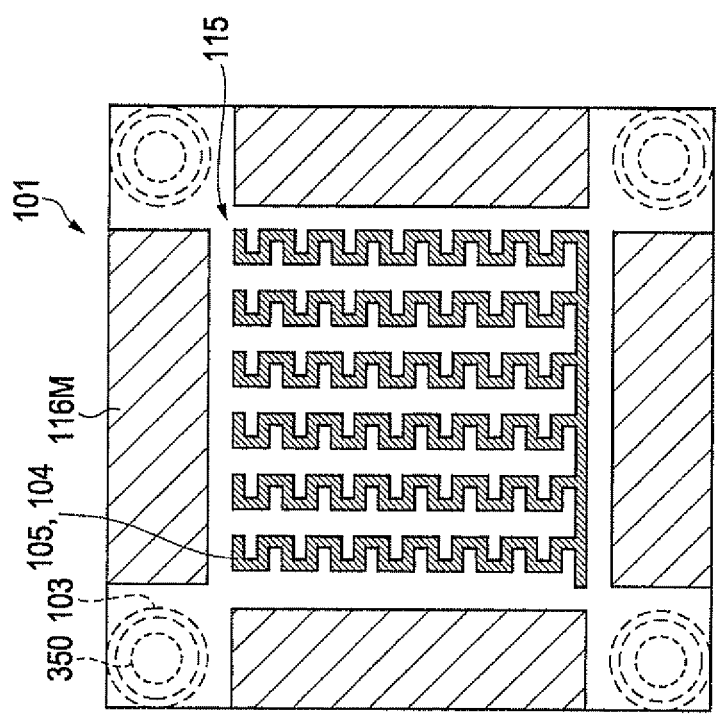

The first restoring parts 116M and the second restoring parts 216M may be located at positions other than the corners of the fixed substrate 101 and the movable substrate 201. FIGS. 7A and 7B are plan views when the restoring parts are arranged in a side direction. The description of this modification will be omitted since it is the same as the one shown in FIGS. 4A to 4C, except the arrangement of the first restoring part 116M and the second restoring part 216M in the side direction.

Figure 8A:
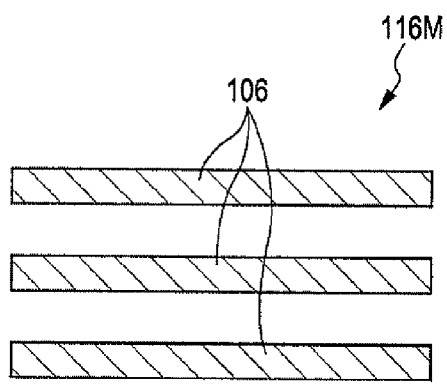
FIGS. 8A and 8B are plan views showing one example of the shapes of the restoring parts.
Figure 8B:
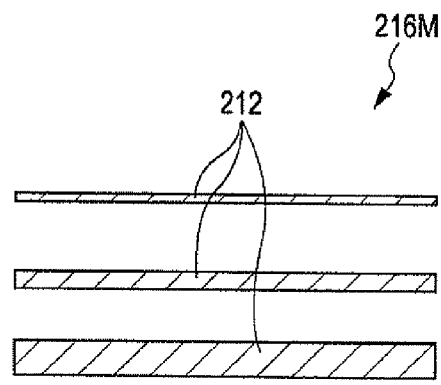

FIGS. 8A and 8B are plan views showing one example of the shapes of the restoring parts in FIGS. 7A and 7B. The width of the second restoring part 216M is made narrower outward. The use of such shapes can likewise generate pull-back force with stable strength in a wide amplitude range.

Although other restoring portions are not shown in FIGS. 5A and 5B, FIGS. 6A and 6B and FIGS. 8A and 8B, the other restoring portions have symmetrical planar shapes.

Although the aforementioned restoring portions have strap-like shapes, they may have undefined shapes. Specifically, the first positioning electrode 106 of the fixed substrate 101 and the second positioning electrode 212 of the movable substrate 201 should only have structures such that as the first positioning electrode 106 and the second positioning electrode 212 move away from the static position, the overlapping area of the first positioning electrode 106 and the second positioning electrodes 212 in plan view of the fixed substrate 101 monotonously decreases. The reduction in the overlapping area in plan view increases the energies of the first positioning electrode 106 and the second positioning electrode 212 of the movable substrate 201, providing an unstable energy state. As a result, force to pull the movable substrate 201 back in the direction of reducing the energy (direction toward the static position), so that the movable substrate 201 returns to the static position eventually. If the substrates can absorb the normal force by vibrating with small amplitude, the overlapping area in plan view might not decrease monotonously.

The power generating device according to the embodiment has the following advantages in addition to the advantages of the first embodiment.

When the movable substrate 201 is supported by springs, it is difficult to convert vibration energy in two axial directions (planar direction) for power generation since the springs supporting the movable substrate 201 are twisted. However, the use of the structure of the second embodiment enables conversion of vibration energy in the planar direction, thus improving the power generation efficiency.

The provision of the first restoring parts 116M and the second restoring parts 216M and sequentially reducing the pattern widths of the second restoring parts 216M can permit generation of pull-back force with stable strength in a wide range.

The patterns of the first restoring part 116M and the second restoring part 216M are not limited to the stepwise patterns, and may take oblique strap-like shapes, so that the degree of freedom of the patterns of the first restoring part 116M and the second restoring part 216M can be improved, thus facilitating the layout design.

The locations of the first restoring parts 116M and the second restoring parts 216M are not limited to the four corners of the power generating device 400, and may be set in the side direction, making the layout design easier.

It is preferable that the first positioning electrode 106 of the fixed substrate 101 and the second positioning electrode 212 of the movable substrate 201 should only have structures such that as the first positioning electrode 106 and the second positioning electrode 212 move away from the static position, the overlapping area of the first positioning electrode 106 and the second positioning electrodes 212 in plan view of the fixed substrate 101 monotonously decreases. In this case, the energies of the first positioning electrode 106 and the second positioning electrode 212 of the movable substrate 201 are increased, so that the energy state becomes unstable as the first positioning electrode 106 and the second positioning electrode 212 move away from the static position. Accordingly, force to pull the movable substrate 201 back in the direction of reducing the energy (direction toward the static position), so that the movable substrate 201 returns to the static position eventually. Therefore, it is possible to finish, for example, the layout design of the first power generating part 115 and the second power generating part 215 on the fixed substrate 101 and the movable substrate 201, and then arrange the first positioning electrode 106 and the second positioning electrodes 212 in empty space, thus making the layout design easier.

Electronic Device

Figure 9:
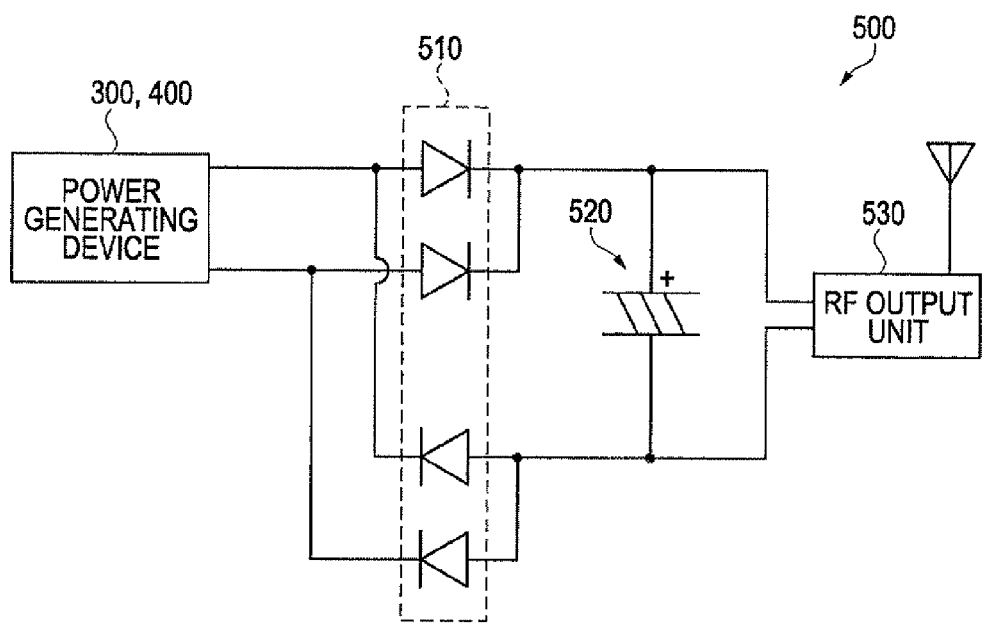
FIG. 9 is an exemplary diagram showing an RF tag as an electronic device.

An electronic device mounted with the power generating device 300 (or 400) according to the aforementioned embodiment will be described referring to the accompanying drawings. FIG. 9 is an exemplary diagram showing an RF tag as an electronic device. An RF tag 500 includes the power generating device 300 or 400, a diode bridge 510, an electric double-layered capacitor 520, and an RF output unit 530.

The AC power that is generated by the power generating device 300, 400 is put through the diode bridge 510 to be rectified, and is stored in the electric double-layered capacitor 520 (a capacitor, a secondary battery or the like having another structure may be used) and output therefrom as DC power. The power generating device 300, 400 using power generation of an electrostatic induction type generate an output voltage of approximately 10 to 30 V or so as peak values, though the generated voltage varies depending on the structure. When ordinary silicon diodes are used in the diode bridge 510, a forward voltage drop of 1.2 V or so occurs, but the output voltage can be rectified with a suppressed power loss since the output voltage is high. A signal is output from the RF output unit 530 in the form of a radio wave based on the power stored in the electric double-layered capacitor 520.

This electronic device has the following advantages in addition to the advantages of the foregoing embodiments.

When the movable substrate 201 (see FIGS. 1A and 1B) which needs large restoring force is shifted considerably from the static position, the structure which uses the magnet 3 (see FIG. 10) to guide the movable substrate to the static position takes time to return the movable substrate to the static position since the magnetic force is inversely proportional to the square of the distance. As a result, the efficiency of converting vibration energy to electric energy drops. By contrast, the use of the electrode structure as adopted in any embodiment allows the movable substrate to be guided to the static position when the movable substrate is shifted considerably from the static position. Accordingly, the time to return the movable substrate to the static position is shortened, providing high power generation efficiency. When weak vibration is applied to the movable substrate 201, the amplitude of the movable substrate 201 can be secured with weak electrostatic force, so that the energy conversion efficiency can be kept high. It is therefore possible to provide stable power generation efficiency with respect to high/low intensity of the vibration energy, so that communications can be executed stably.

The RF tag 500 as shown in FIG. 9 is provided as an electronic device having higher reliability as compared with the case of using the power generating device which uses springs to support the movable substrate. It is therefore possible to cope with application of embedding the RF tag 500 at a location where replacement is difficult. Since the diameter of the bearing 350 itself becomes a gap, gap accuracy can be improved. The high gap accuracy can make the amount of the gap smaller, improving the power generation efficiency, so that communications can be executed stably.

This application claims priority to Japanese Patent Application No. 2010-258641 filed on Nov. 19, 2010. The entire disclosure of Japanese Patent Application No. 2010-258641 is hereby incorporated herein by reference.

What is claimed is:

1. A power generating device comprising:
a first substrate;
a first electrode provided on a first surface of the first substrate;
a second substrate having a second surface opposing the first surface with a distance between the first substrate and the second substrate and movable within a predetermined range from a static position in a planar direction of the first substrate;
a second electrode provided on the second surface of the second substrate and at least partially overlapping the first electrode in plan view of the first substrate in the static position;
a first positioning electrode provided on the first surface and being chargeable with a first polarity; and
a second positioning electrode provided on the second surface and being chargeable with a second polarity opposite to the first polarity,
the first positioning electrode and the second positioning electrode at least partially overlapping each other in plan view in the static position.

2. The power generating device according to claim 1, wherein each of the first positioning electrode and the second positioning electrode includes at least one of a plurality of electrodes and an electrode having a plurality of electrodes partially connected each other, the plurality of electrodes at least partially overlapping each other in plan view, and
at least one of the first positioning electrode and the second positioning electrode has strap-like shapes of different widths or bending strap-like shapes of different widths.

3. The power generating device according to claim 2, wherein three or more regions having the strap-like shapes are formed in a widthwise direction, and pitches between the strap-like shapes at least partially different from each other.

4. The power generating device according to claim 2, wherein a width of at least a part of regions having the strap-like shapes is wider than widths of the first electrode and the second electrode.

5. The power generating device according to claim 1, wherein the first positioning electrode and the second positioning electrode have shapes such that a total area of a region where the first positioning electrode and the second positioning electrode overlap each other in plan view decreases substantially monotonously to generate force between the first positioning electrode and the second positioning electrode to return the second substrate to the static position as the second substrate moves away from the static position in the planar direction.

6. The power generating device according to claim 1, wherein at least one of the first electrode and the second electrode includes an electret member being chargeable.

7. An electronic device including the power generating device according to claim 1.

8. An electronic device including the power generating device according to claim 2.

9. An electronic device including the power generating device according to claim 3.

10. An electronic device including the power generating device according to claim 4.

11. An electronic device including the power generating device according to claim 5.

12. An electronic device including the power generating device according to claim 6.

* * * * *